(12) United States Patent
Nishihashi

(10) Patent No.: US 10,328,950 B2
(45) Date of Patent: Jun. 25, 2019

(54) VEHICLE EQUIPMENT CONTROL DEVICE AND METHOD OF SEARCHING FOR CONTROL CONTENT

(71) Applicant: DENSO CORPORATION, Kariya, Aichi-pref. (JP)

(72) Inventor: Shigeaki Nishihashi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/506,765

(22) PCT Filed: Sep. 4, 2015

(86) PCT No.: PCT/JP2015/004498
§ 371 (c)(1),
(2) Date: Feb. 27, 2017

(87) PCT Pub. No.: WO2016/042725
PCT Pub. Date: Mar. 24, 2016

(65) Prior Publication Data
US 2017/0274909 A1  Sep. 28, 2017

(30) Foreign Application Priority Data
Sep. 15, 2014 (JP) .................................. 2014-187164

(51) Int. Cl.
*B60W 50/10* (2012.01)
*G06F 16/2457* (2019.01)
(Continued)

(52) U.S. Cl.
CPC ............. *B60W 50/10* (2013.01); *B60K 35/00* (2013.01); *B60K 37/06* (2013.01);
(Continued)

(58) Field of Classification Search
USPC .......................................................... 701/36
See application file for complete search history.

(56) References Cited

U.S. PATENT DOCUMENTS

| 2005/0021341 | A1* | 1/2005 | Matsubara | G10L 15/07 704/275 |
| 2006/0119488 | A1* | 6/2006 | Hoiness | H04Q 9/00 340/870.02 |

(Continued)

FOREIGN PATENT DOCUMENTS

| JP | 4155383 B2 | 9/2008 |
| JP | 2009180914 A | 8/2009 |

(Continued)

*Primary Examiner* — Tyler D Paige
(74) *Attorney, Agent, or Firm* — Harness, Dickey & Pierce, P.L.C.

(57) ABSTRACT

A control device to control operations of a plurality of pieces of equipment used in a vehicle includes a search processing unit and an operation target guessing unit. The search processing unit searches, using a search term inputted by a user, for control contents associated with the search term among a plurality of control contents executable by the plurality of pieces of equipment used in the vehicle. The operation target guessing unit guesses, based on the state of the screen currently displayed on a display device, operation target equipment that the user intends to operate. The control device then sorts search results obtained by the searching processing unit in descending order of the degree of relevance to the operation target equipment and has the sorted search results displayed.

8 Claims, 6 Drawing Sheets

(51) Int. Cl.
*B60R 16/037* (2006.01)
*H04N 7/18* (2006.01)
*G10L 15/00* (2013.01)
*B60W 50/08* (2012.01)
*B60W 50/12* (2012.01)
*B60K 35/00* (2006.01)
*B60K 37/06* (2006.01)
*G10L 15/30* (2013.01)
*G10L 15/183* (2013.01)
*G10L 15/22* (2006.01)

(52) U.S. Cl.
CPC ....... *B60R 16/0373* (2013.01); *B60W 50/087* (2013.01); *B60W 50/12* (2013.01); *G06F 16/24575* (2019.01); *G10L 15/00* (2013.01); *H04N 7/18* (2013.01); *B60K 2350/1004* (2013.01); *B60K 2350/1028* (2013.01); *B60K 2350/1032* (2013.01); *G10L 15/183* (2013.01); *G10L 15/30* (2013.01); *G10L 2015/223* (2013.01)

(56) References Cited

U.S. PATENT DOCUMENTS

| | | | |
|---|---|---|---|
| 2010/0153111 A1* | 6/2010 | Hirai | B60R 16/0373 704/251 |
| 2010/0184011 A1* | 7/2010 | Comerford | G10L 15/26 434/321 |
| 2015/0358396 A1* | 12/2015 | Akatsu | G06Q 30/02 709/219 |
| 2016/0269524 A1* | 9/2016 | Stottlemyer | H04M 1/6091 |
| 2017/0274909 A1* | 9/2017 | Nishihashi | G10L 15/00 |

FOREIGN PATENT DOCUMENTS

| | | |
|---|---|---|
| JP | 2010217944 A | 9/2010 |
| JP | 2013007917 A | 1/2013 |

* cited by examiner

VEHICLE EQUIPMENT CONTROL DEVICE AND METHOD OF SEARCHING FOR CONTROL CONTENT

CROSS REFERENCE TO RELATED APPLICATIONS

This application is a U.S. National Phase Application under 35 U.S.C. 371 of International Application No. PCT/JP2015/004498 filed on Sep. 4, 2015 and published in Japanese as WO 2016/042725 A1 on Mar. 24, 2016. This application is based on and claims the benefit of priority from Japanese Patent Application No. 2014-187164 filed on Sep. 15, 2014. The entire disclosures of all of the above applications are incorporated herein by reference.

TECHNICAL FIELD

The present disclosure relates to a vehicle equipment control device to control operations of plural pieces of equipment used in a vehicle based on search terms inputted by a user and a method of searching for a control content associated with a search term inputted by a user among control contents executable by the plural pieces of equipment.

BACKGROUND ART

Vehicle equipment control devices have been disclosed (e.g. Patent Literature 1) which each control, based on voice input made by a user, operations of plural pieces of equipment, for example, audio equipment, air-conditioners, and navigation devices having respective functions. In such type of vehicle equipment control devices, voice commands for executing control contents which are executable by respective pieces of vehicle equipment have been registered beforehand. When a voice command is inputted to such a vehicle equipment control device, the control device identifies a control content associated with the voice command and has the control content executed by predetermined equipment. Namely, the voice command serves as a search term to identify a control content to be executed.

According to Patent Literature 1, the frequency of use by a user of the function of each piece of equipment is memorized and, when a search term associated with plural functions is inputted by the user, the most frequently used one of the plural functions is searched for.

Thus, even in cases where a voice command inputted by a user is associated with plural functions, the vehicle equipment control device according to Patent Literature 1 can identify the function to be used and the control content to be executed by the function.

PRIOR ART LITERATURE

Patent Literature

Patent Literature 1: JP 4155383 B2

SUMMARY OF INVENTION

In the device according to Patent Literature 1, when a voice command inputted by a user is associated with plural functions, a function with a higher frequency of use is executed with priority even if the user's intention is to execute a function which has been relatively low in the frequency of use. Therefore, when the user wishes to use a function which has been relatively low in the frequency of use, it is necessary, for example, to make a renewed voice input using an expression which can differentiate the function to be used from other functions or to carry out manual operation instead of making a voice input to have the intended function executed.

To address the above problem, a configuration may be conceivable (referred to as a "conceived configuration") in which, when a search term is inputted by a user, a search is made for control contents associated with the search term and search results are displayed, for example, in a list form. In the conceived configuration, the user can select a desired control content from among the listed search results and can have the selected control content executed.

However, displaying search results associated with a search term inputted by a user as they are may cause a burden on the user to select a desired item out of the list. For example, when there are many control contents associated with a search term inputted by a user, many control contents are displayed as search results, making it troublesome to find a desired item out of the search results. Also, a user driving a vehicle (i.e. a driver) is required to concentrate on driving operation. It is, therefore, preferable that, once a search term is inputted by the driver, the driver is only required to perform minimum operation to have a desired control content executed.

The present disclosure is aimed at providing a vehicle equipment control device which can reduce the trouble involved in having a desired control content executed by one of plural pieces of equipment used in a vehicle and a method applicable to the vehicle equipment control device when searching for a control content.

A vehicle equipment control device according to an aspect of the present disclosure controls operations of a plurality of pieces of equipment used in a vehicle. The vehicle equipment control device includes: an operation acceptance unit that accepts a user's operation to start inputting a search term for use as a search keyword; a function management database that memorizes a plurality of control contents executable by the equipment such that each of the control contents is associated with at least one word representing the each of the control contents; a search term obtaining unit that obtains the search term based on acceptance by the operation acceptance unit of the user's operation; a search processing unit that searches the function management database using the search term obtained by the search term obtaining unit and that obtains, as search results, a list of the control contents associated with the search term; a screen information obtaining unit that obtains screen information representing a state of screen displayed on a display device at a time when the operation acceptance unit has accepted the user's operation; an operation target guessing unit that guesses operation target equipment that the user intends to operate of the plurality of pieces of equipment based on the screen information obtained by the screen information obtaining unit; and a search result output unit that has, of the search results obtained by the search processing unit, a control content to be executed by the operation target equipment displayed on a screen to display the search results or executed with priority over control contents to be executed by another piece of equipment.

In the above configuration, the operation target guessing unit guesses, based on the state of the screen at the time when user's operation to start inputting a search term has been made, an operation target device that the user intends to operate. The operation of the operation target guessing unit will be described below before the operation of the vehicle equipment control device as a whole.

Normally, the screen displayed on a display device corresponds to one of plural pieces of equipment. Also, the screen displayed when user's operation to start inputting a search term is performed corresponds to the user's operation accepted immediately before the search term started being inputted. Namely, the screen information indicates the equipment operated by the user immediately in advance.

To have a predetermined control content executed by equipment used in a vehicle, a user is, in many cases, required to perform a series of input operations. Therefore, compared with other equipment, the equipment operated by the user immediately in advance is highly likely to be kept in operation by the user. Namely, the operation target guessing unit can guess, based on the screen information, the equipment that the user intends to operate.

The search result output unit has, among the search results obtained by the search processing unit, the search results executable by the operation target equipment displayed or executed with priority.

When a screen showing search results is to be displayed by the search result output unit, among the control contents associated with the search term, the control contents executable by the operation target equipment guessed by the operation target guessing unit are displayed with priority. The operation target equipment guessed by the operation target guessing unit is, as described above, the equipment that the user highly likely intends to operate. That is, the control content desired by the user is likely to be displayed with priority on the screen to show search results.

Also, in cases in which the screen displayed at a time when user's operation to start inputting a search term has been made is associated with the equipment to execute the control content desired by the user, the control content desired by the user is displayed with priority. Therefore, when inputting a search term is started whereas the screen displayed is associated with the equipment to execute the control content desired by the user, the user can easily find an item corresponding to the desired control content even in cases where plural search results exist. Namely, the vehicle equipment control device is configured to allow the user to have, more easily and in less time, a desired control content executed by one of the plural pieces of equipment used in the vehicle.

The search result output unit may be made to execute, out of the search results, a control content to be executed by the operation target equipment with priority. The control content executed in this case is, as described above, highly likely to be the control content desired by the user. Particularly, in cases where the display screen appearing when user's operation to start inputting a search term has been performed is associated with the equipment to execute the control content desired by the user, the control content desired by the user is executed.

Therefore, the configuration in this case, too, allows the user to have, more easily and in less time, a desired control content executed by one of the plural pieces of equipment used in the vehicle. In cases where the search result output unit is made to execute, out of the search results, a control content to be executed by the operation target equipment with priority, the step of selecting, out of the search results, a control content desired by the user can be omitted.

A control content search method according to an aspect of the present disclosure includes: obtaining a search term for use as a search keyword; searching a function management database using the search term obtained by a search term obtaining unit, the function management database memorizing a plurality of control contents executable by a plurality of pieces of equipment used in a vehicle such that each of the control contents is associated with at least one word representing the each of the control contents, and obtaining, as search results, a list of control contents corresponding to the search term out of the plurality of control contents; obtaining screen information representing a state of screen display on a display device at a time when user's operation to start inputting the search term has been accepted; based on the screen information obtained by the obtaining of the screen information, guessing operation target equipment that the user intends to operate out of the plurality of pieces of equipment; and arranging the search results obtained as a list of control contents in descending order of a degree of relevance to the operation target equipment guessed by an operation target guessing unit.

The above control content search method corresponds to the method used by the above-described vehicle equipment control device in searching for a control content associated with a search term inputted by a user. Hence, using this control content search method generates the same effects as generated when the above-described vehicle equipment control device is used.

BRIEF DESCRIPTION OF DRAWINGS

The above and other objects, features and advantages of the present disclosure will become more apparent from the following detailed description made with reference to the accompanying drawings, in which.

DESCRIPTION OF EMBODIMENT

Figure 1:
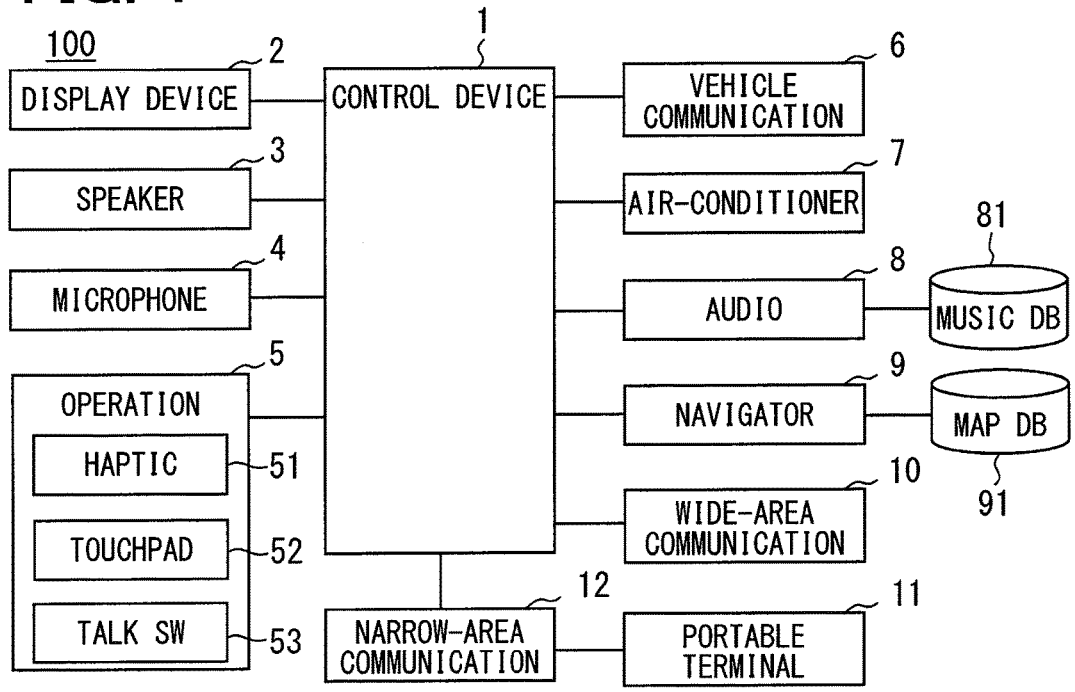
FIG. 1 is a block diagram showing an example outline configuration of a vehicle equipment control system according to the present embodiment.

In the following, an embodiment of the present disclosure will be described with reference to drawings. FIG. 1 is a diagram showing an example outline configuration of a vehicle equipment control system 100 according to the present embodiment. The vehicle equipment control system 100 supports a user in operating, by means of, for example, voice input or hand-written character input, a wide variety of equipment for in-vehicle use by the user including vehicle-mounted equipment and equipment brought into the vehicle interior by the user.

As shown in FIG. 1, the vehicle equipment control system 100 includes a control device 1, a display device 2, a speaker 3, a microphone 4, an operation unit 5, a vehicle communication unit 6, an air conditioning device 7, an audio device 8, a navigation device 9, a wide-area communication unit 10, a portable terminal 11, and a narrow-area communication unit 12.

The air conditioning equipment (hereinafter referred to as an "air conditioner") 7, the audio device 8 and the navigation device 9 are regarded as the abovementioned vehicle-mounted equipment. Also, the portable terminal 11 is equipment brought into the vehicle by the user and is temporarily associated with the vehicle-mounted equipment. The navigation device 9 need not be a vehicle-mounted one and may be one brought into the vehicle interior by the user.

The control device 1, display device 2, speaker 3, microphone 4, operation unit 5, vehicle communication unit 6, air conditioner 7, audio device 8, navigation device 9, wide-area communication unit 10, and narrow-area communication unit 12 are mutually communicably coupled. The control device 1 communicates also with the portable terminal 11 via the narrow-area communication unit 12 as described later.

Of the elements provided in the vehicle equipment control system 100, the control device 1 plays a role to control a wide variety of equipment for in-vehicle use by the user. Namely, the control device 1 is equivalent to the vehicle equipment control device. Based on an input operation made by the user using the operation unit 5, the control device 1 makes the device corresponding to the input operation execute the control operation corresponding to the input operation.

Besides the functions of the foregoing equipment and devices, the user can also use functions provided by various application programs (hereinafter referred to as "applications") installed in the control device 1. The functions provided by applications installed in the control device 1 include, for example, a web browsing function to search for and browse information stored on the Internet. Namely, the control device 1 itself can also be a device to provide the user with a predetermined function. In the following, the air conditioner 7, audio device 8, navigation device 9, portable terminal 11, and control device 1 may each also be referred to as a "control target." The elements of the vehicle equipment control system 100 will be described below.

The display device 2 displays texts and images based on instructions from the control device 1. The display device 2 is, for example, one capable of full-color display and may be configured with, for example, a liquid crystal display or an organic EL display. In the present embodiment, the display device 2 is a center display positioned in a center portion in the vehicle-width direction of an instrument panel.

In an alternative configuration, the display device 2 may be a meter display positioned in an upper portion on the driver seat side of the instrument panel or may be a well-known head-up display. Further, the display device 2 may be realized by combining plural kinds of displays.

The speaker 3 outputs an electrical voice signal inputted from the control device 1 after conversion into voice (may be mere sound). The microphone 4 is, for example, a non-directional compact microphone which collects voice uttered by the user and ambient sound including noise and outputs the collected voice and sound to the control device 1 after conversion into an electrical voice signal. The microphone 4 is positioned in a location suitable for collecting user's voice, for example, on an upper part of the steering column cover or on the sun visor on the driver seat side.

The operation unit 5 is configured with a group of devices for use by the user to input instructions to the control device 1 so as to have various functions of the air conditioner 7, audio device 8, navigation device 9, portable terminal 11 and the control device 1 itself executed. For example, by operating the operation unit 5, the user can instruct starting/stopping of the air conditioner 7 and changing the temperature setting of the air conditioner 7.

In the present embodiment as an example case, the operation unit 5 is provided with a haptic device 51, a touchpad (handwriting input device) 52, and talk switch (hereinafter abbreviated as "SW") 53.

The haptic device 51 is a pointing device to move a cursor displayed on the screen of the display device 2 and selects a target pointed by the cursor. To be more specific, the haptic device 51 has a movable part to indicate the direction in which the cursor is to be moved and a decision switch to select a target pointed by the cursor (to input a decision).

Also, the haptic device 51 is provided with an internal actuator and, by controlling the operation of the actuator, reactive forces corresponding to cursor movement operation and selection operation are applied to the user's hand. For example, in a state where a button image (hereinafter referred to as a "button") selectable by the user is displayed on the display device 2, when the cursor is moved on to the button from an area outside the button, the haptic device 51, by operating the actuator, gives a sense of touching the button displayed on the display screen to the driver's hand.

The touchpad 52 has a sensor part shaped like a flat plate and identifies the location of the user's finger over the sensor part based on variation of the electrostatic capacitance formed between the sensor part and the finger. Also, the touchpad 52 obtains, based on time-series data on the finger position over the sensor part, trace data representing the trace of movement of the finger run over the surface of the sensor part. By moving his/her finger over the sensor part of the touchpad 52, the user can move the cursor displayed on the display screen like when using the haptic device 51.

In the present embodiment, the control device 1 performs well-known handwriting recognition processing in cooperation with the touchpad 52. By writing characters by hand on the sensor part of the touchpad 52, the user can input a desired character string. The touchpad 52 is equivalent to the handwriting input device.

The talk SW 53 is used by the user to instruct starting of voice input. In the present case, the talk SW 53 is, as an example, assumed to be a click switch included in the haptic device 51. When set to on (i.e. when clicked) by the user, the talk SW 53 outputs an on signal to the control device 1. By this, the control device 1 can detect execution of the operation by the user to start voice input.

When an on signal is inputted from the talk SW 53, the control device 1 performs processing to obtain voice data. By starting talking within a certain time (e.g. within 1.5 seconds) after setting the talk SW 53 to on, the user can input the talk voice to the control device 1.

Though, in the present embodiment, the talk SW 53 is integrated with the haptic device 51, an alternative configuration may be used. In an alternative configuration, the talk SW 53 may be provided in a location to allow easy operation by the user, for example, on a side portion of the steering column or in the vicinity of the shift lever. Also, the talk SW 53 may be a button provided on the display screen, that is, a software switch.

Examples of devices included in the operation unit 5 have been described, but the devices included in the operation unit 5 are not limited to the above-described devices. In addition to the above-described devices, the operation unit 5 may also include, for example, mechanical switches and a touch panel laminated on the display panel included in the display device 2. Also, it is not always necessary that the operation unit 5 includes all of the devices described above.

The vehicle communication unit 6 obtains various information (vehicle information) from vehicle-mounted devices such as an ECU (Electronic Control Unit), various sensors and other vehicle-mounted equipment (e.g. the air conditioner 7). For example, the vehicle communication unit 6 can obtain vehicle information by communicating with the ECU, sensors and other devices via a well-known in-vehicle network. The in-vehicle network is a network interconnecting the ECU and sensors mounted in the vehicle. The vehicle information obtained by the vehicle communication unit 6 is sequentially supplied to the control device 1.

The vehicle information preferably includes, in addition to traveling condition information concerning vehicle traveling, external environment information about out-of-vehicle environment (e.g. weather) and setting information representing, for example, various device settings. The elements of the traveling condition information may include various state quantities representing traveling states of the vehicle, for example, location information, traveling speed (hereinafter "vehicle speed"), travel direction, acceleration rate, steering angle, shift position, and parking brake setting. Various state quantities may be detected, measured or estimated using well-known techniques.

The external environment information includes, for example, weather information and traffic congestion information representing a traffic congestion degree. Whether it is raining or not may be detected using a raindrop sensor mounted in the vehicle. The external environment information may be obtained from outside via the wide-area communication unit 10.

The setting information refers to, for example, temperature setting on the air conditioner 7, destination setting on the navigation device 9, and destination history information. The setting information is obtained from various devices, for example, based on instructions from a vehicle information obtaining unit F3, to be described later, included in the control device 1. Furthermore, the vehicle information may also include information indicating the vehicle interior temperature detected by an interior temperature sensor and information indicating the number of people aboard the vehicle determined based on the results of detection by seating sensors (hereinafter "vehicle interior information").

The air conditioner 7 is a well-known vehicle-mounted air conditioning device and adjusts vehicle-interior temperature and humidity by operating based on instructions from the control device 1. For example, the air conditioner 7 adjusts the temperature of air blown out from an air outlet of the air conditioner 7 so as to make the vehicle-interior temperature agree with the temperature specified by the user. The air conditioner 7 can also control, independently of the target temperature, the volume of air blown out from the air outlet of the air conditioner 7. The functions that the air conditioner 7 is provided with are collectively referred to as the "air conditioner function." The temperature adjustment function (for raising/lowering temperature) and air volume adjustment function of the air conditioner 7 are finer-unit functions (so-called sub-functions) included in the air-conditioner function.

The air conditioner 7 may have a configuration which includes a right air outlet located on the right side of the instrument panel and a left air outlet located on the left side of the instrument panel and in which the temperature and volume of air blown out through each of the air outlets can be independently controlled.

The audio device 8 reproduces music data stored in a music database (hereinafter abbreviated as "DB") 81 and outputs the reproduced sound from the speaker 3 based on an instruction from the control device 1. The music DB 81 may be realized using a well-known memory medium, for example, a HDD (hard disk drive). A memory device to memorize the music data may be realized by combining plural kinds of memory media.

The music data includes meta data representing, for example, information about the album in which the music data is included, artist information, song names, performance time, and evaluation. Plural pieces of music data stored in the music DB 81 are hierarchically managed based on, for example, album information and artist information.

The audio device 8 not only reproduces music as described above but also searches for songs by an artist specified by the user and also for an album specified by the user and songs contained in the album. The functions of the audio device 8 are collectively referred to as the "audio function."

The navigation device 9 has functions similar to the functions of a well-known navigation device and can display, using map data stored in the map DB 91, a map image showing an area around a current location on the display device 2 and perform route guidance to guide the vehicle from the current location to a destination. The destination is a location set based on user's operation. The functions of the navigation device 9 are collectively referred to as the "navigation function."

The map data used by the navigation device 9 includes, for example, road data representing interconnections of roads, drawing data for drawing map images, and facility data representing information about facilities. The information about facilities includes, for example, facility names, facility categories (e.g. restaurants, shops, tourist spots), and facility addresses. The map DB 91 to store the map data described above may be realized using a well-known memory medium. The map DB 91 need not be mounted in the vehicle, and a configuration may be used in which data required to display a map image as described above is obtained from an external server provided outside the vehicle via the wide-area communication unit 10 to be described later.

The wide-area communication unit 10 is provided with a transmitting/receiving antenna and communicates with equipment provided outside the vehicle and connected to the Internet. The control device 1 can access the Internet via the wide-area communication unit 10.

The portable terminal 11 is a well-known portable information processing terminal brought into the vehicle interior by the user. For example, the portable terminal 11 may be a smartphone or a tablet terminal. An ordinary portable terminal operates, when communication with the control device 1 is established, as the portable terminal 11 of the present embodiment.

The control device 1 and the portable terminal 11 communicate with each other via the narrow-area communication unit 12. When the portable terminal 11 and the control device 1 are set to be cooperative with each other, the control device 1 can display the screen of the portable terminal 11 on the display device 2 and can have an application installed in the portable terminal 11 executed. The functions of the portable terminal 11 are collectively referred to as the "portable terminal function."

The narrow-band communication unit 12 plays a role of an interface through which the portable terminal 11 and the control device 1 can communicate with each other. The portable terminal 11 and the control device 1 may be wirelessly connected with each other using near-field communication technology such as Bluetooth (registered trademark) or may be wire-connected with each other.

The control device 1 is configured as an ordinary computer and includes well-known devices (none shown), for example, a CPU, non-volatile memories such as a ROM and a flash memory, volatile memories such as a RAM, I/O devices, and a bus line interconnecting these devices. Non-volatile memories included in the control device 1 store programs and data used by the CPU in executing various kinds of processing.

Figure 2:
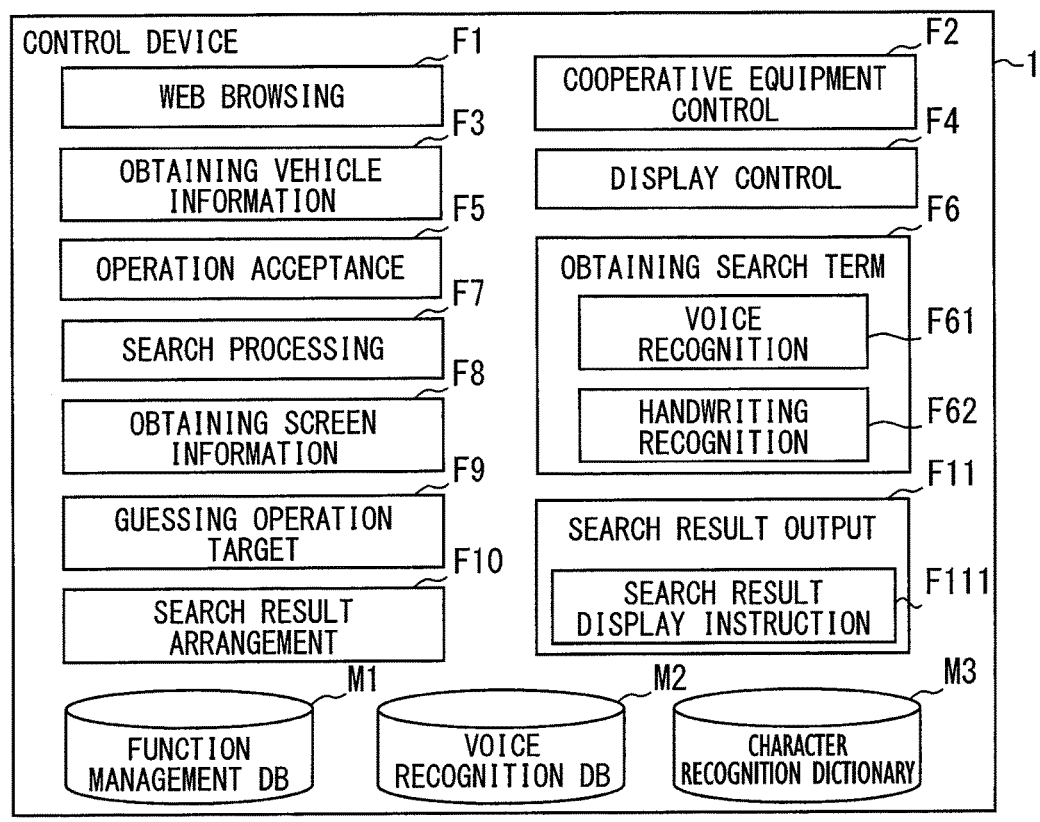
FIG. 2 is a block diagram showing an example outline configuration of a control device according to the present embodiment.

The control device 1 includes function blocks as shown in FIG. 2, i.e. a web browsing unit F1, a cooperative equipment control unit F2, a vehicle information obtaining unit F3, a display control unit F4, an operation acceptance unit F5, a search term obtaining unit F6, a search processing unit F7, a screen information obtaining unit F8, an operation target guessing unit F9, a search result arranging unit F10, and a search result output unit F11. Also, the control device 1 has a function management DB M1, a voice recognition DB M2, and a character recognition dictionary M3 which are provided on well-known non-volatile memory media.

The web browsing unit F1 accesses the Internet in cooperation with the wide-area communication unit 10, obtains a web page corresponding to the user's operation accepted by the operation acceptance unit F5 and displays the web page on the display device 2. It is when user's operation for starting web page browsing is accepted by the operation acceptance unit F5 that the web browsing unit F1 is activated. The functions provided by the web browsing unit F1 will hereinafter be referred to as the "Internet function."

The cooperative equipment control unit F2 controls operations of the equipment (hereinafter "cooperative equipment") set to be cooperative with the control device 1. The cooperative equipment referred to herein is equipment mutually communicably connected with the control device 1 and provides predetermined functions. Namely, in the present embodiment, the cooperative equipment includes the air conditioner 7, audio device 8, navigation device 9, and portable terminal 11.

When user's operation (may be a voice input) is accepted by the operation acceptance unit F5 to be described later, the cooperative equipment control unit F2 instructs the control target corresponding to the user's operation to execute the control content that corresponds to the user's operation.

The vehicle information obtaining unit F3 obtains vehicle information from the vehicle communication unit 6. The vehicle information obtaining unit F3 also obtains setting information by requesting the vehicle communication unit 6 to obtain setting information such as setting values set on the cooperative equipment.

Furthermore, the vehicle information obtaining unit F3 determines whether or not the vehicle is traveling based on vehicle information obtained (traveling condition information, in particular). For example, when the vehicle speed is not lower than a predetermined threshold (e.g. 3 km/h), the vehicle information obtaining unit F3 determines that the vehicle is traveling and, when the vehicle speed is lower than a predetermined threshold, the vehicle information obtaining unit F3 determines that the vehicle is not traveling. Also, when the shift position is for parking or when the parking brake is on, it may be determined that the vehicle is not traveling.

The function management DB M1 memorizes data (referred to as "function management data") associating the control contents that can be executed by the cooperative equipment and the control device 1 itself with words related with the control contents. The control contents that can be executed by the cooperative equipment and the control device 1 itself are the control contents that the user can instruct the control device 1 and the cooperative equipment to execute.

Figure 3:
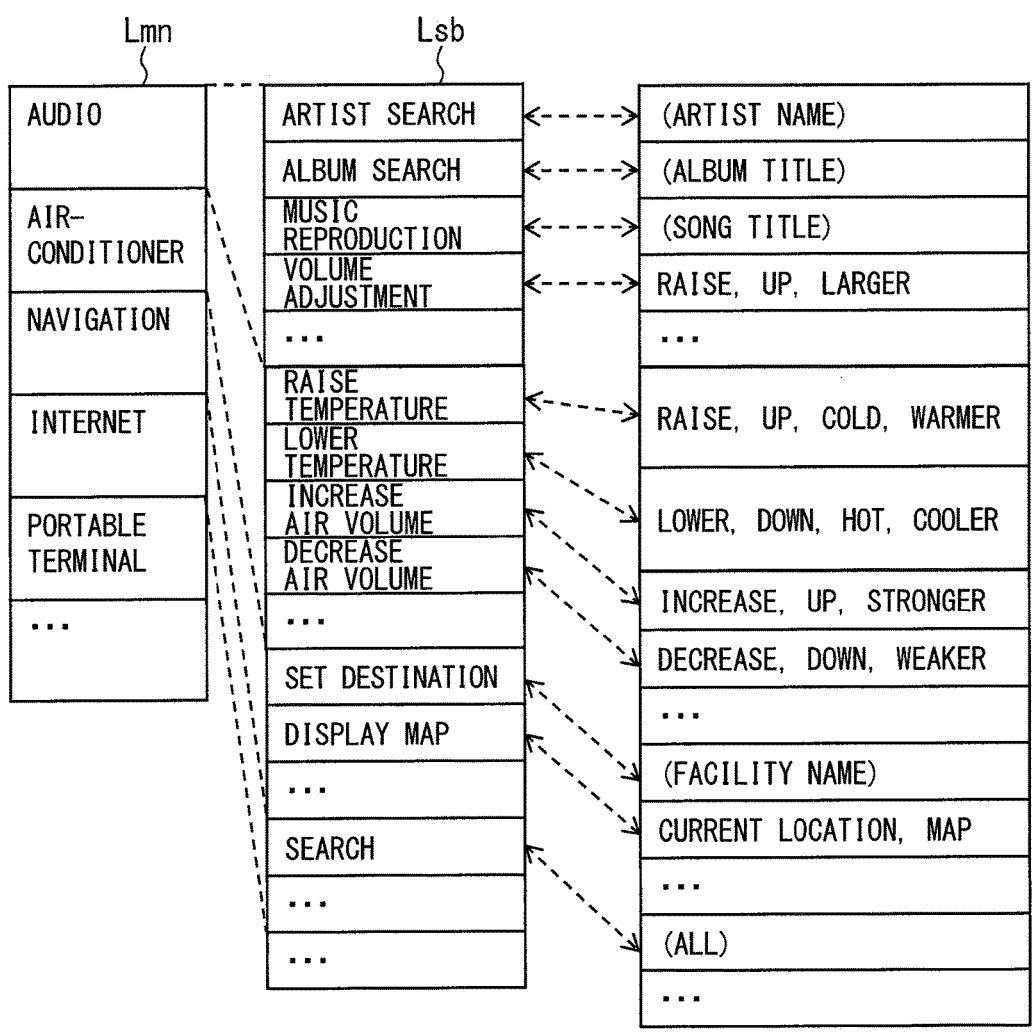
FIG. 3 is an example configuration of function management data memorized in a function management database.

An example configuration of function management data memorized in the function management DB M1 is shown in FIG. 3. As shown in FIG. 3, in the function management data, the control contents that the user can instruct the control device 1 and cooperative equipment to execute are managed being classified according to pieces of equipment (or functions) to execute the control contents.

To be more specific, the function management data includes a main function list Lmn forming the highest order of data and a control content list Lsb subordinate to the main function list. The main function list Lmn lists the functions (main functions) corresponding to various control targets. Namely, the main function list Lmn includes items corresponding to the audio function, air conditioner function, navigation function, Internet function, and portable terminal function.

The control content list Lsb lists the control contents executable by the respective main functions. Namely, the control contents listed in the control content list Lsb are equivalent to the sub-functions of the main functions.

The control contents executed by the audio function include artist search processing in which the user searches the music DB 81 for songs by an optional artist and album search processing in which songs contained in an optional album are searched for. The control content list Lsb itself may also be hierarchically structured. Each of the control contents is associated with a main function to execute the control content.

Each control content is associated with at least one word predetermined to represent the control content. For example, in the function management DB M1, the control content "Raise temperature" included in the air conditioner function is memorized being associated with such words as "Raise," "Up," "Cold," and "Warm" as shown in FIG. 3. Also, "Artist search" included in the audio function is associated with all of the various artist names contained in the music data. Artist names can be obtained as required by searching the area where the music data is stored.

The control content "Set destination" included in the navigation function is associated with the facility names contained in the map data. Facility names can be obtained by browsing facility data as required. The control content "Search" included in the Internet function is associated with all words (or phrases).

Generally, vehicle-mounted devices incorporate a function (a so-called travel-forcing function) to prohibit execution of predetermined functions while the vehicle is traveling. The control device 1 of the present embodiment is also assumed to have a travel-forcing function to prohibit, while the vehicle is traveling, execution of some of the control contents listed in the control content list Lsb. The function management DB M1 memorizes a list of the control contents subjected to the travel-forcing function. In the present embodiment, searching on the Internet is, as an example, subjected to the travel-forcing function.

The display control unit F4 controls the display screen of the display device 2. The screens displayed under control of the display control unit F4 include a main menu screen on which the user can select a control target (a main function) to be operated and a screen corresponding to the audio function. On the audio function screen, the user can select a desired one of the sub-functions of the audio function.

Figure 4:
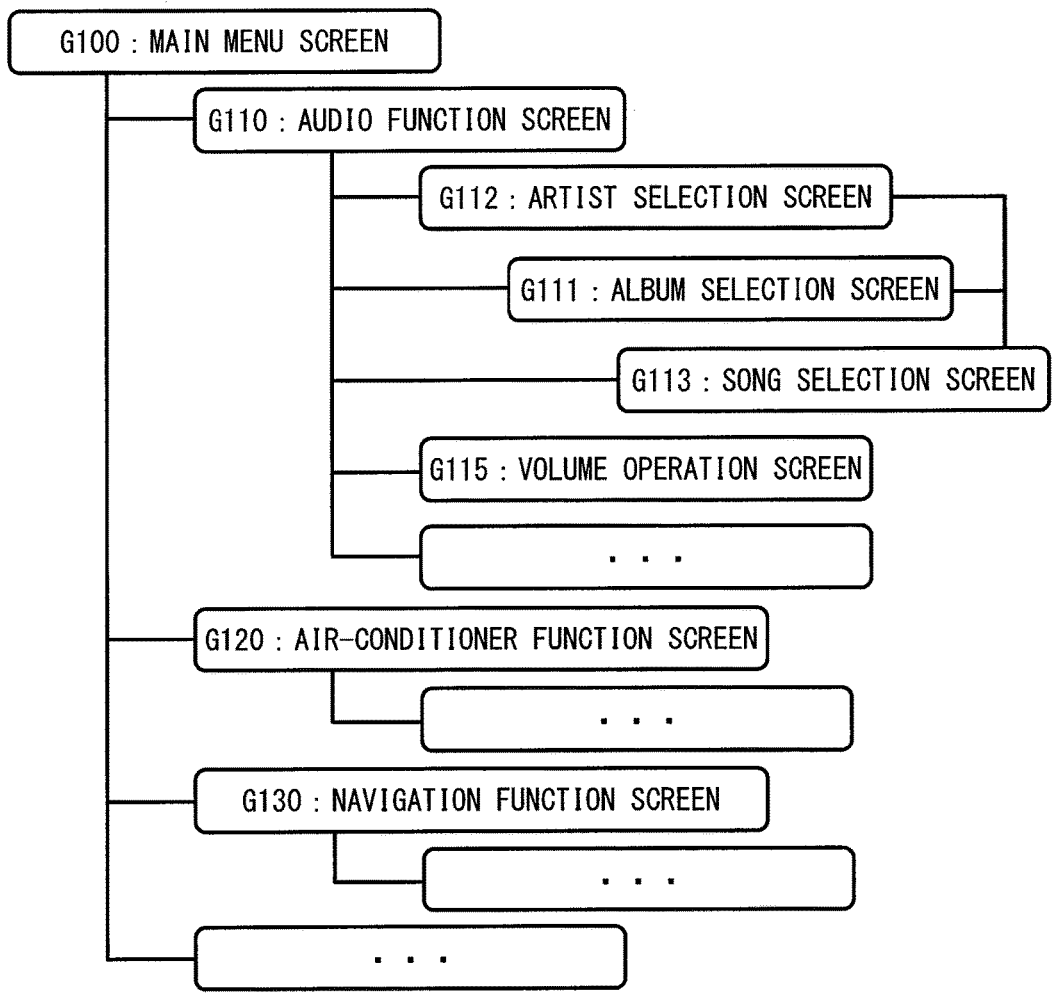
FIG. 4 is an example organization of various screens that a display control unit causes to be displayed.

The screens that the display control unit F4 displays on the display device 2 are organized in a tree-like configuration as shown in FIG. 4. To be more specific, the main menu screen is set as the highest-order screen. The screens corresponding to the control targets to which the user can input instructions such as the audio function screen, air conditioner function screen, and navigation function screen are set to be subordinate to the main menu screen.

The air conditioner function screen is used to operate the air conditioner 7, for example, to adjust the temperature and air volume settings. The navigation function screen corresponds to the navigation device 9 and is used by the user to select a desired one of the functions of the navigation device 9.

The screens displayed under control of the display control unit F4 each have an identification number (a screen ID). Using the screen IDs, the display control unit F4 can identify the currently displayed screen and the screen to be displayed next. In the example shown in FIG. 4, for example, the main menu screen has a screen ID of G100, the audio function screen has a screen ID of G110, and the air conditioner function screen has a screen ID of G120.

Furthermore, the screens displayed under control of the display control unit F4 each include at least one button selectable by the user. For example, by selecting a button on a screen, the user can change the screen to another one or can have a selected one of the control contents executed. Namely, the buttons each have a function as an option selectable by the user to specify a desired control content to be executed. The buttons each have a unique button ID associated with the corresponding screen ID, the device to be a control target, and the corresponding control content. The display control unit F4 changes the screen currently displayed to other screens in cooperation with the operation acceptance unit F5 being described next.

Figure 5:
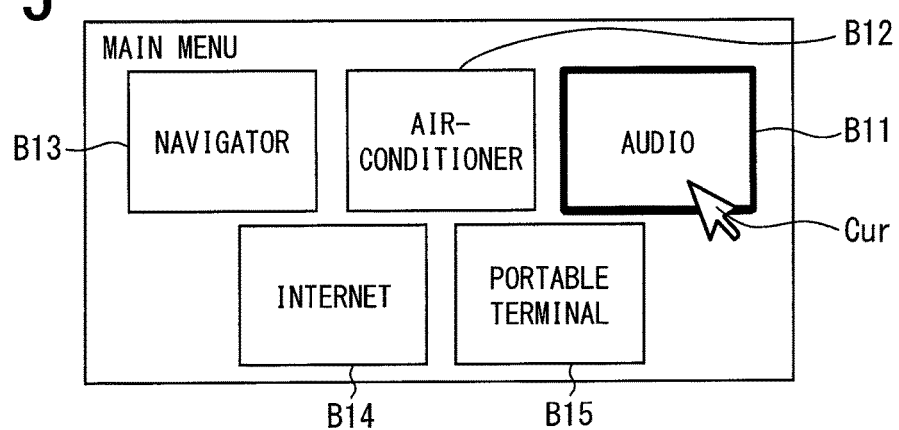
FIG. 5 shows an example main menu screen.

How the buttons displayed on a screen work will be described based on an example shown in FIG. 5 of the main menu screen. As shown in FIG. 5, the main menu screen shows buttons B11 to B15 selectable by the user. Buttons B11 to B15 are each for use by the user in selecting a control target. To be more specific, button B11 allows the user to start a series of input operations to execute sub-functions of the audio device 8 and, when the button is selected by the user, the display control unit F4 displays the audio function screen on the display device 2.

Button B12 is for operating the air conditioner 7, and button 13 is for operating the navigation device 9. Button B14 is for activating the web browsing unit F1 and using the Internet. Button B15 is used to start using a function of the portable terminal 11.

The user can move cursor Cur on the display screen by operating the operation unit 5. FIG. 5 shows a state in which the cursor is on button B11. When the cursor is aligned on a button, display of the button is intensified to appear differently from the other buttons. In the following, a button indicated by the cursor Cur will be referred to as a "temporarily selected button."

In a state where an optional button is temporarily selected, the user can select the button by depressing the decision button of the haptic device 51. Namely, in the state shown in FIG. 5, when the user depresses the decision button, the display changes to the audio function screen.

The user can branch from the main menu screen to various screens associated with control targets operable by the user and, as the user branches to a lower level screen, a more specific function can be selected on the screen. The screen that is eventually reached after following a screen used by the user to instruct execution of a desired control content shows that the control content specified by the user is being executed. Besides the screens described above, the display control unit F4 can also have a search result screen, to be described later, displayed based on an instruction from the search result output unit F11.

The operation acceptance unit F5 accepts user's operation made at the operation unit 5. For example, when the user using the haptic device 51 makes operation to move the cursor on the display screen, the operation acceptance unit F5 requests the display control unit F4 to move the cursor corresponding to the amount of operation made by the user.

Also, when the user makes operation to select a button displayed on the screen, the operation acceptance unit F5 requests the display control unit F4 to change the display to the screen corresponding to the selection operation made by the user. To be more specific, when a control signal indicating execution of a decision operation by the user is received from the operation unit 5, the operation acceptance unit F5 identifies, based on the current cursor location, the button selected by the user. The operation acceptance unit F5 then identifies the screen ID corresponding to the button ID and requests the display control unit F4 to change the display to the corresponding screen.

Furthermore, when the button selected by the user is for giving an instruction to a predetermined control target to execute a predetermined sub-function (i.e. a control content), the operation acceptance unit F5 causes the control content corresponding to the button selected by the user to be executed. The button locations on each screen are predetermined, so that, when a button is selected by the user, the operation acceptance unit F5 can identify the selected button based on the screen ID of the current screen and the current cursor location.

The operation acceptance unit F5 also accepts user's operation made to start character input by use of the touchpad 52 and user's operation made to end the character input by use of the touchpad 52. The operation acceptance unit F5 also accepts, based on a control signal inputted from the talk SW 53, user's operation made to start voice input. These operations made by the user are equivalent to user's operation made to start search term input.

The search term obtaining unit F6 obtains a search term for use in function search processing to be described later. The search term may be either a single word or a phrase of plural words.

In the present embodiment, the search term obtaining unit F6 includes a voice recognition unit F61 to obtain a search term based on user's utterance and a handwriting recognition unit F62 to obtain a search term via the touchpad 52. Though, in the present embodiment, a configuration in which the voice recognition unit F61 and the handwriting recognition unit F62 are both provided is used, an alternative configuration including only one of the voice recognition unit F61 and the handwriting recognition unit F62 may also be used.

To be more specific, upon detection, based on a control signal inputted from the talk SW 53, of clicking by the user, the voice recognition unit F61 enters a voice input awaiting state and subsequently obtains voice data generated by user's utterance via the microphone 4. The voice recognition unit F61 subjects the voice data to well-known voice recognition processing using various data stored in the voice recognition DB M2 and obtains text data corresponding to the voice data. The text data is equivalent to a search term.

The voice recognition DB M2 stores, as data necessary for voice recognition processing, for example, acoustic models representing acoustic features of human's utterance in small units (phonemes), a recognition dictionary in which acoustic features of phonemes and words are associated, and language models representing adjacency relations between words.

Though, in the present embodiment, the control device 1 has the voice recognition DB M2 and performs voice recognition processing within the control device 1, an alternative arrangement may be made. For example, voice recognition processing may be performed at a center facility outside the vehicle.

For example, the search term obtaining unit F6 transmits voice data inputted by a user to the center facility via the wide-area communication unit 10. At the center facility, the voice data received is subjected to voice recognition processing for conversion into text data and the text data generated is sent back to the control device 1. When this arrangement is used, the function of the control device 1 can be simplified, and the user can input a search term by voice even when the control device 1 is not provided with the voice recognition DB M2.

When the handwriting recognition unit F62 accepts user's operation for starting character input by use of the touchpad 52, the handwriting recognition unit F62 performs well-known character recognition processing based on the finger trace data obtained by the touchpad 52 and identifies a character corresponding to the trace data inputted by the user. Until user's operation indicating completion of the character input is accepted, the handwriting recognition unit F62 continues identifying characters to obtain a character string as a search term.

To recognize hand-written characters, well-known methods may be utilized. For example, a recognition system may be arranged combining a form-based character recognition method (so-called offline recognition) and a handwriting-based character recognition (so-called online recognition). The character recognition dictionary M3 included in the control device 1 contains data such as character shape pattern data for use in character recognition processing.

As in the case of the voice recognition unit F61, the character recognition processing performed by the handwriting recognition unit F62 may be performed at a center facility outside the vehicle. Namely, the search term obtaining unit F6 may have a configuration in which the finger trace data obtained by the touchpad 52 is transmitted to a center facility and, at the center facility, the finger trace data is subjected to character recognition processing and characters are identified. The characters identified at the center facility may be sequentially sent back to the control device 1 or may be sent back as a character string when user's operation indicating completion of the character input is accepted.

The search processing unit F7 searches the function management DB M1 using a search term obtained by the search term obtaining unit F6. To be more specific, the search processing unit F7 searches for a control content associated with a word which coincides with the search term. The coincidence in this case is not limited to a complete coincidence and may be a partial coincidence. Also, the search processing unit F7 may perform searching using an expression resembling the search term.

The search processing unit F7 obtains, as search results, a list of control contents associated with a word coinciding with the search term. Depending on the type of control contents, there may be control contents which require words coinciding with search terms for use as control parameters. In such cases, the search processing unit F7 also obtains words coinciding with the search terms by associating the words with sub-functions.

For example, when the artist names contained in the music data stored in a HDD include an artist name partly coinciding with a search term, the search processing unit F7 obtains, as a search result, a control content for searching for songs by the artist.

When the facility data includes a facility name partly coinciding with a search term, the search processing unit F7 obtains, as a search result, a control content for setting the facility as a destination according to the navigation function.

The screen information obtaining unit F8 obtains information (screen information) about the screen displayed on the display device 2 from the display control unit F4. The screen information is, for example, a screen ID or a button ID of a button being temporarily selected. The screen ID is equivalent to the screen type information. The button ID is equivalent to the selection target information.

The operation target guessing unit F9 guesses the function that the user intends to use (operation target function) based on the screen information obtained by the screen information obtaining unit F8. The operation target function refers to, in the concept equivalent to a main function, equipment that the user intends to operate (i.e. operation target equipment). In a state where the current display screen is for selecting a sub-function belonging to a main function with a button shown on the screen temporarily selected, the operation target function can be made specific down to the sub-function level (i.e. down to a control content).

For example, the operation target guessing unit F9 regards the main function provided by the control target corresponding to the screen ID included in the screen information as the control target function that the user intends to operate. Also, when the screen information includes the button ID of a temporarily selected button, the operation target guessing unit F9 guesses that the user intends to execute the control content corresponding to the button ID. The control content corresponding to the button ID of the temporarily selected button is equivalent to a control content candidate.

The search result arranging unit F10 arranges the results of searching made by the search processing unit F7 based on the operation target function guessed by the operation target guessing unit F9. Arranging the search results in this case refers to, for example, rearranging the search results based on a predetermined rule (so-called sorting) or decreasing the number of the search results by excluding control contents meeting a predetermined condition.

In an example operation performed in the present embodiment, the search result arranging unit F10 sorts the results of searching made by the search processing unit F7 to arrange the search results in descending order of the degree of relevance to the operation target function guessed by the operation target guessing unit F9. The relevance degree may be determined, for example, as follows. When the search results include a control content which is provided by the control target function and which corresponds to the button ID of a temporarily selected button, the control content is determined to have the highest degree of relevance to the operation target function. The control content to be determined to have the next highest degree of relevance to the control target function is a control content to be executed by the control target function. A control content to be executed by a main function different from the control target function is determined to have the lowest degree of relevance to the control target function.

For example, when the operation target function is the audio function and the search results include a control content belonging to the audio function, the control content belonging to the audio function is placed at a higher level than the control contents belonging to other main functions. When there are control contents of a same degree of relevance to the operation target function, such control contents may be arranged, for example, in order of detection time during searching or in order of names.

The search result arranging unit F10 decreases the number of the search results based on the vehicle information obtained by the vehicle information obtaining unit F3. To be more specific, when the vehicle information obtaining unit F3 has determined based on the vehicle information that the vehicle is currently traveling, items corresponding to control contents execution of which is prohibited during traveling are removed from the search results. When, based on the vehicle information, it has been determined by the vehicle information obtaining unit F3 that the vehicle is not currently traveling, the search results are left as they are.

The search result output unit F11 includes, as a finer functional block, a search result display instruction unit F111. The search result display instruction unit F111 instructs the display control unit F4 to display the search result screen showing a list of the search results arranged by the search result arranging unit F10. The image itself to be the source of the search result screen may be generated, for example, by the display control unit F4. To be more specific, the search result display instruction unit F111 provides the display control unit F4 with data representing the search results arranged by the search result arranging unit F10, and the display control unit F4 generates, based on the search result data, an image to be the source of the search result screen and has it displayed on the display device 2. An example of the search result screen and operation of the search result display instruction unit F111 will be described later.

Figure 6:
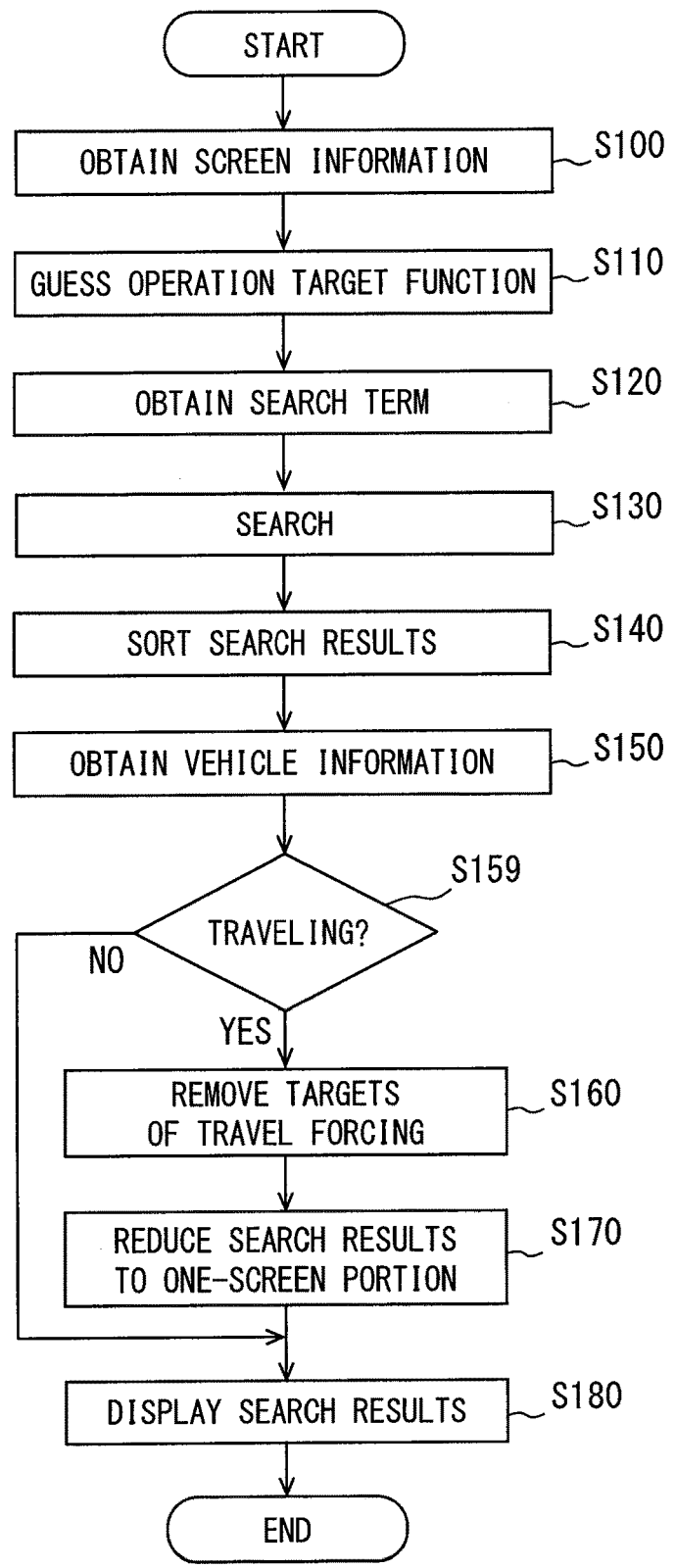
FIG. 6 is a flowchart showing an example of function search processing performed by the control device.

Next, with reference to the flowchart shown in FIG. 6, the function search processing performed by the control device 1 will be described. The function search processing is a series of processing performed to search for control contents related with a search term inputted by the user and display the search results on the display device 2. The flowchart shown in FIG. 6 may be started, for example, when user's operation to input a search term is accepted by the operation acceptance unit F5. The user's operation to input a search term refers to, for example, user's operation to start character input using the touchpad 52 or user's operation to start voice input. The function search processing shown in FIG. 6 corresponds to the control content search method.

First, in S100, the screen information obtaining unit F8 obtains screen information about the current display screen, then processing advances to S110. The S100 is equivalent to obtaining the screen information.

In S110, the operation target guessing unit F9 guesses the operation target function based on the screen information obtained by the screen information obtaining unit F8, then processing advances to S120. The S110 is equivalent to guessing the operation target function (device).

In S120, the search term obtaining unit F6 obtains a search term, then processing advances to S130. For example, when this processing is started by accepting user's operation to start voice input as a trigger, the voice recognition unit F61 obtains the search term by performing voice recognition processing. Also, when this processing is started by accepting user's operation to start character input by use of the touchpad 52 as a trigger, the handwriting recognition unit F62 obtains the search term based on the input operation performed by the user using the touchpad 52. The S120 is equivalent to obtaining a search term.

In S130, the search processing unit F7 searches the function management DB M1 using the search term obtained by the search term obtaining unit F6 and obtains, as search results, a list of control contents associated with a word coinciding with the search term. When the processing in S130 is completed, processing advances to S140. The S130 is equivalent to obtaining, as search results, a list of control contents corresponding to the search term.

In S140, the search result arrangement unit F10 sorts the search results obtained by the search processing unit F7 to arrange the search results in descending order of the degree of relevance to the operation target function guessed by the operation target guessing unit F9, then processing advances to S150. The S140 is equivalent to sorting, i.e. arranging the search results in descending order of the degree of relevance to the operation target function (device).

In S150, the vehicle information obtaining unit F3 obtains vehicle information, then processing advances to S159. In S159, the vehicle information obtaining unit F3 determines whether or not the vehicle is traveling based on the vehicle information. When the vehicle information obtaining unit F3 determines that the vehicle is traveling, the result of S159 is YES and processing advances to S160. When, on the other hand, the vehicle information obtaining unit F3 determines that the vehicle is not traveling, the result of S159 is NO and processing advances to S180.

In S160, the search result arranging unit F10 removes, from the control contents included in the search results, those control contents defined as targets of travel forcing, then processing advances to S170. In S170, the search result arranging unit F10 decreases the number of the search results to a number displayable on one screen, then processing advances to S180. The number of search results displayable on one screen may be a predetermined number.

In S180, the search result display instruction unit F111 requests the display control unit F4 to display the search results arranged as described above. Then, the display control unit F4 causes the search result screen to be displayed and terminates the present processing.

Next, specific examples of function search processing performed in various situations will be described. Regarding the following description, it is assumed that the HDD included in the audio device 8 holds songs by an artist named "ABC EFG Band." Also, the map data is assumed to store information about facilities named "ABC HIJ Mart" and "ABC KLM Foods," respectively. Also, plural control contents associated with word "ABC" are assumed to be memorized in the function management DB M1.

First, the function search processing will be described based on the assumption that the display screen is in a state as shown in FIG. 5 with the vehicle not currently traveling. When the display screen is in a state as shown in FIG. 5, button B11 for operating the audio device 8 has been temporarily selected on the main menu screen.

In the above state, when the user clicks talk SW 53 and says "ABC," the voice recognition unit F61 obtains a search term "ABC" by subjecting the voice data inputted from the microphone to the voice recognition processing (S120). Then, the search processing unit F7 detects, as search results, control contents associated with a word coinciding with the search term "ABC" (S130).

To be more specific, the control contents detected by the search processing unit F7 may include control contents such as searching for songs by "ABC EFG Band" which has been hit in a search as an artist name provided by the audio function, setting "ABC HIJ Mart" or "ABC KCL Foods" which has been hit in a search as a facility name as a destination for the navigation function, and searching for "ABC" using the Internet function.

On the other hand, the screen information obtaining unit F8 obtains screen information indicating that button B11 has been temporarily selected on the main menu screen (S100), and the operation target guessing unit F9 guesses that the operation target function is the audio function (S110).

Therefore, the search result arranging unit F10 rearranges the search results obtained by the search processing unit F7 such that search results related with the audio function are higher-ordered in the list of search results (S140). Since the vehicle is stopped, the result of S159 is NO, so that the search result display instruction unit F111 has a search result screen showing the search results sorted in S140 displayed.

Figure 7:
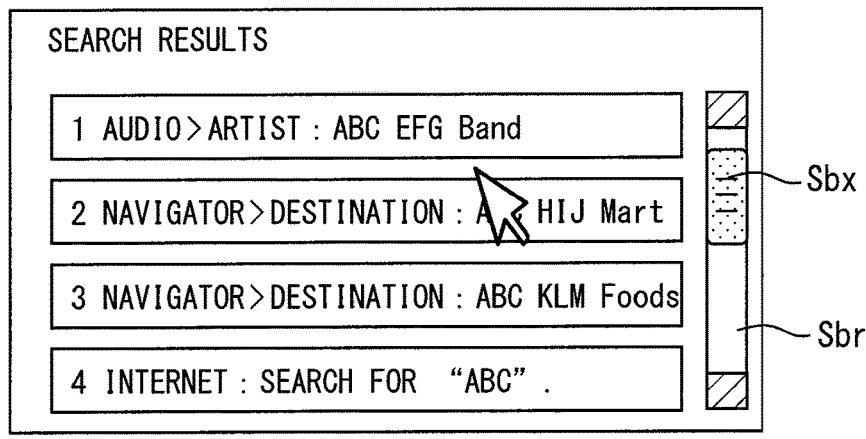
FIG. 7 shows an example search result screen displayed when the vehicle is stopped.

FIG. 7 shows an example search result screen shown as a result of the above processing. The search result screen displayed when the vehicle is stopped shows a list of items corresponding to all the control contents detected as search results. As for the items not included in the initially displayed search result screen, the user can have such items displayed by sliding a scroll box Xbx shown in the scroll bar Sbr.

According to the configuration of the present embodiment, among the search results, an item corresponding to the control content for searching for songs by "ABC EFG Band" that is related with the operation target function "audio function" guessed by the operation target guessing unit F9 tops the list displayed on the search result screen as shown in FIG. 7. Namely, out of the search results, the item related with the operation target function "audio function" guessed by the operation target guessing unit F9 is displayed with priority.

The processing performed when the vehicle is stopped has been described above. Next, the processing performed when the vehicle is traveling will be described. Except that the vehicle is travelling, the situation is assumed to be the same as in the foregoing processing.

When the vehicle is traveling, the result of S159 is YES, and the search result arranging unit F10 removes the items subject to the travel-forcing function from the search result list rearranged to show search results related with the operation target function in higher places. In the present embodiment, the search function on the Internet is subject to the travel-forcing function. Therefore, the item representing searching for "ABC" on the Internet is removed from the search results. Also, the search result arranging unit F10 decreases the number of the items included in the search results to a number displayable on one screen.

Figure 8:
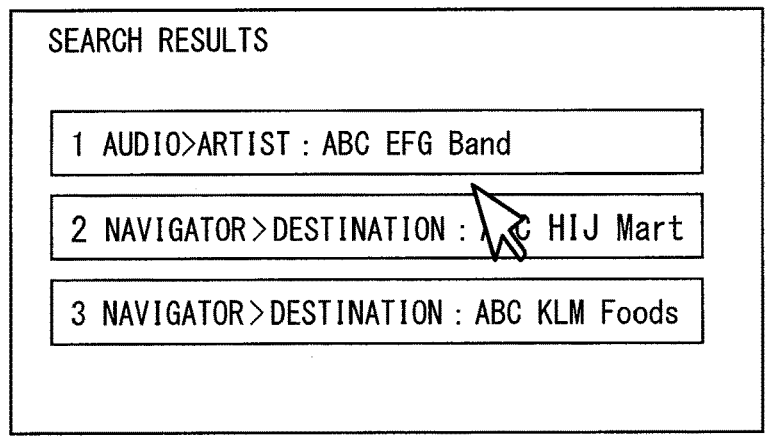
FIG. 8 shows an example search result screen displayed when the vehicle is traveling.

An example search result screen displayed when the vehicle is traveling is shown in FIG. 8. When the vehicle is traveling, too, the items related with the operation target function are shown in higher places with priority. Unlike the search result screen shown in FIG. 7, however, the search result screen displayed when the vehicle is traveling does not show the scroll bar Sbr and scroll box Sbx. Namely, only as many search results as displayable on one screen appear. Also, no items corresponding to control contents subject to the travel-forcing function are displayed.

The configuration as described above makes it possible to reduce the amount of information included in the search result screen and makes it easy for the user to determine whether or not a desired control content is shown on the search result screen. Also, in cases where a control content desired by the user is included in the search results, the control content can be found easily.

In the above processing examples, the audio function is assumed to be the operation target function. When, in a different situation, the navigation function is assumed to be the operation target function, items corresponding to the control content for setting "ABC HIJ Mart" or "ABC KLM Foods" as a destination in route guide processing are displayed with priority.

Figure 9:
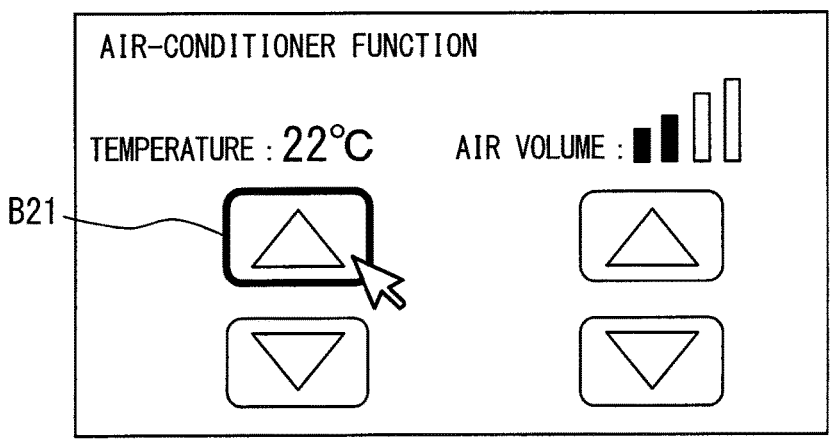
FIG. 9 shows an example air-conditioner function screen.

Next, the function search processing in a different situation in which the air-conditioner function screen is currently displayed with button B21 for raising the temperature temporarily selected as shown in FIG. 9 will be described. The vehicle is assumed to be stopped.

When, in the above situation, the user depresses talk SW 53 and says "Up," the search processing unit F7 detects, as search results, control contents associated with the search term "Up." In this case, with the air-conditioner function screen currently displayed, the operation target guessing unit F9 guesses that the operation target function is the air-conditioner function. Also, since button B21 for raising the temperature setting is temporarily selected, the operation target function more specifically guesses that the operation target function is the temperature raising function included in the air-conditioner function.

Based on the result of guessing made by the operation target guessing unit F9, the search result arranging unit F10 determines that, in the search result list, the control content for raising the temperature setting of the air conditioner 7 is most highly relevant to the operation target function. Since the control content for increasing the air volume is also a control content corresponding to a sub-function of the air-conditioner function, it is determined that the control content for increasing the air volume is, next to the control content for raising the temperature, most highly relevant to the operation target function.

On the other hand, the control content for increasing the voice volume executable by the audio function is a control content provided by a device different from the operation target function, so that the relevance of the control content to the operation target function is determined to be relatively low. The search result arranging unit F10 sorts the search results based on the above consideration.

Figure 10:
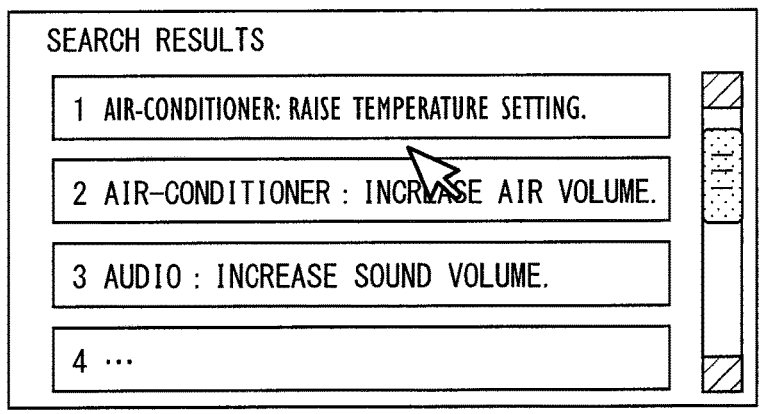
FIG. 10 shows an example search result screen.

The search result display instruction unit F111 has the search result screen corresponding to the search results sorted by the search result arranging unit F10 displayed. Namely, the search result screen on which, as shown in FIG. 10, an item corresponding to the control content for raising the temperature setting of the air conditioner is listed at the top and an item corresponding to the control content for increasing the air volume is listed at the second top is displayed.

According to the above configuration, when the user wishes to execute a desired control content, for example, with respect to the audio function, the user is to input a search term corresponding to the desired control content in a state with the button for changing to the audio function screen temporarily selected on the main menu screen or in a state with a screen subordinate to the audio function screen displayed.

In such a case, even when there are plural control contents associated with a word coinciding with the search term, the control contents belonging to the audio function are displayed with priority, so that the user can easily find a desired control content. Thus, the above configuration allows the user to execute a desired control content with more ease.

An embodiment of the present disclosure has been described, but the present disclosure is not limited to the above embodiment, and the following embodiment is also included in the technical scope of the present disclosure. Furthermore, besides the following embodiment, various other modifications can also be made without departing from the scope of the present disclosure.

<First Modification>

In the foregoing embodiment, the search result output unit F11 has search results excluding control contents subject to the travel-forcing function displayed, but alternative arrangements are also possible. For example, the search result arranging unit F10 provides the search result output unit F11 with search results rearranged in descending order of the degree of relevance to the operation target function.

The search result display instruction unit F111 has, among the sorted search results, the control contents subject to the travel-forcing function displayed differently from the control contents not subject to the travel-forcing function. Also, on the search result screen, the items corresponding to the control contents subject to the travel-forcing function are made unselectable by the user. An example search result screen displayed with the vehicle traveling according to the first modification is shown in FIG. 11.

Figure 11:
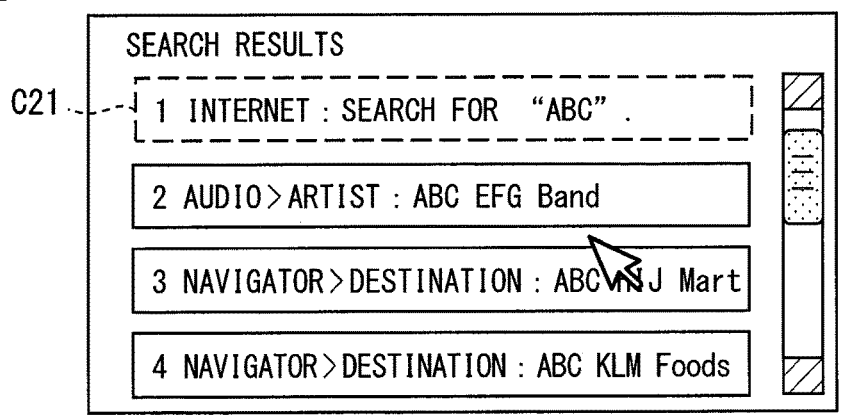
FIG. 11 shows an example search result screen according to a first modification.

The search result screen shown in FIG. 11 represents a case in which the operation target function is the Internet function. In the case of the first modification, item C21 corresponding to a control content for making a search on the Internet for information coinciding with a search term "ABC" represents a control content corresponding to the operation target function and is, therefore, displayed at the top of the search result screen as shown in FIG. 11. However, because the vehicle is not traveling, item C21 has no button function and is displayed such that the user can recognize that item C21 is not selectable.

According to the above configuration, the user can recognize that a desired control content is represented in the search results and also that the desired control content cannot be executed while the vehicle is traveling.

<Second Modification>

Figure 12:
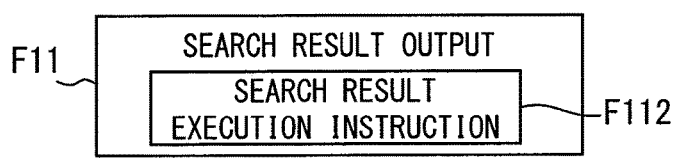
FIG. 12 is a block diagram showing an example outline configuration of a search result output unit according to a second modification.

In the above examples, as a method of utilizing the search results arranged by the search result arranging unit F10, the search result display instruction unit F111 in cooperation with the display control unit F4 has a search result screen showing a search result list displayed, but an alternative method may be used. For example, of the search results arranged by the search result arranging unit F10, the search result topping the list may be executed without having the search result screen displayed. The function that the search result output unit F11 is provided with and that has the top-placed search result among the search results arranged by the search result arranging unit F10 executed is referred to as a "search result execution instruction unit F112" (see FIG. 12).

In this case, it is assumed that, even with the vehicle traveling, the search results are inclusive of search results subject to the travel-forcing function. When the top-placed control content among the search results rearranged by the search result arranging unit F10 happens to be subject to the travel-forcing function, the user is to be notified that the control content to be executed cannot be executed as the vehicle is traveling.

For such a case with the vehicle traveling, an alternative arrangement is also possible in which, for example, the search result output unit F11 has the top-placed control content executed out of the control contents excluding the control contents subject to the travel-forcing function.

<Third Modification>

Figure 13:
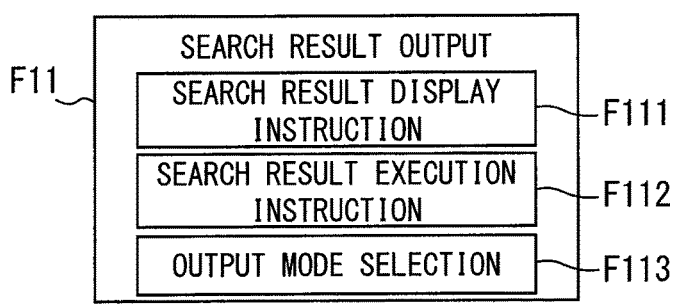
FIG. 13 is a block diagram showing an example outline configuration of a search result output unit according to a third modification.

A configuration is also possible in which it is selectable whether to have the search result screen displayed or to have a search content automatically executed without having the search result screen displayed. Namely, the search result output unit F11 may have both the search result display instruction unit F111 and the search result execution instruction unit F112. In this case, the search result output unit F11 may also have an output mode section unit F113 (see FIG. 13) for selecting whether to have the search result screen displayed or to have a search result automatically executed without displaying the search result screen. Namely, the output mode selection unit F113 selects which to operate, the search result display instruction unit F111 or the search result execution instruction unit F112. In the following, the selection made by the output mode selection unit F113 between the search result display instruction unit F111 and the search result execution instruction unit F112 will be referred to as "output mode selection."

For example, the control device 1 is configured to allow the user to set an operation mode in advance to either display the search result screen or execute a search result automatically without displaying the search result screen. Then, the output mode selection unit F113 can determine the output mode based on the operation mode set by the user.

The output mode selection unit F113 may select an output mode based on the attribute of a word included in the search term inputted by the user. For example, when, as described in Patent Literature 1, the search term includes both a function word specifying a device function and an instruction word indicating the content of execution of the function, the search result execution instruction unit F112 is to be operated. On the other hand, when the search term includes only either a function word or an instruction word, the search result display instruction unit F111 is to be operated.

Furthermore, the output mode selection unit F113 may select an output mode based on the number of control contents included in the search results obtained by the search processing unit F7. For example, when only one search result has been obtained by the search processing unit F7, the search result execution instruction unit F112 is to be operated. When, on the other hand, two or more search results have been obtained by the search processing unit F7, the search result display instruction unit F111 is to be operated. In this manner of operation, when a search term inputted by the user contains information enough to uniquely define a control content to be executed, the control content is executed without having the search result screen displayed.

<Fourth Modification>

Also, after sorting the search results obtained by the search processing unit F7 in descending order of the degree of relevance to the operation target function guessed by the operation target guessing unit F9 (referred to as "primary sorting"), the search result arranging unit F10 may further sort the search results based on the vehicle information obtained by the vehicle information obtaining unit F3 (referred to as "secondary sorting").

In a configuration to implement the fourth modification, the function management DB M1 memorizes, out of the control contents to be managed, control contents which are highly related with predetermined conditions (e.g. rain and traffic jams) by associating such control contents with related conditions. Also, the search result arranging unit F10 is assumed to have a function for determining, based on the vehicle information obtained by the vehicle information obtaining unit F3, whether or not the current condition corresponds to a predetermined condition (e.g. rain or a traffic jam).

For example, when the air conditioner 7 has a control content for operating a defroster (defogging function), the function management DB M1 memorizes the control content associating the control content with rain. Also, when vehicle information which includes information indicating rainy weather has been received, the search result arranging unit F10 determines that it is raining.

Subsequently, if the user inputs a search term "Airconditioner setting" while it is raining, the search result arranging unit F10 places the control content for operating the defroster in a higher place among the primary-sorted search results.

The control contents to be placed higher as a result of secondary sorting are only those control contents corresponding to the conditions represented by the current vehicle information. Namely, among the primary-sorted search results, the control contents not corresponding to the conditions represented by the current vehicle information are left unchanged from the primary-sorted state in terms of the relative priority relationship between them.

The flowchart included in this application or the processing based on the flowchart is composed of plural sections (or referred to as "steps"), and each section is denoted, for example, as S100. Each section can be divided into plural sub-sections, whereas it is also possible to combine plural sections into one section. The sections configured as described above can each be referred to as a "device," a "module," or a "means."

The present disclosure has been described based on an embodiment, but it is to be understood that the present disclosure is not limited to the embodiment and configurations described above. The present disclosure embraces various modifications including modifications falling within an equivalent scope. Furthermore, various combinations and aspects, and also other combinations and aspects including only an element or less than an element or more than an element of such various combinations and aspects are also included in the scope and idea of the present disclosure.

The invention claimed is:

1. A vehicle equipment control device to control operations of a plurality of pieces of equipment used in a vehicle, comprising:
   a function management database that stores a plurality of control contents executable by the plurality of pieces of equipment such that each of the control contents is associated with at least one word representing the corresponding control content;
   a processor and memory storing instructions that configure the processor to:
   accept a user's operation to start inputting a search term for use as a search keyword;
   obtain the search term based on acceptance of the user's operation;
   search the function management database using the obtained search term and obtain, as search results, a list of control contents associated with the search term from the plurality of control contents;
   obtain screen information representing a state of a screen displayed on a display device at a time when the user's operation is accepted, the screen information representing the state of the screen including a piece of information indicating a temporary selection by a user corresponding to one of the plurality of pieces of equipment;
   determine an operation target equipment that the user intends to operate from the plurality of pieces of equipment based on the obtained screen information, the operation target equipment being determined based on the piece of information indicating the temporary selection corresponding to the one of the plurality of pieces of equipment;
   arrange, based on the determined operation target equipment the list of control contents from the obtained search results in descending order of a degree of relevance to the determined operation target equipment such that control contents in the list of control contents that are executable by the determined operation target equipment are arranged in the descending order before control contents in the list of control contents that are not executable by the determined operation target equipment; and
   instruct the display device to display a search result screen showing the arranged search results so that the control contents in the list of control contents that are executable by the determined operation target equipment are displayed with priority ahead of the control contents in the list of control contents that are not executable by the determined operation target equipment.

2. The vehicle equipment control device according to claim 1,
   wherein the screen displayed on the display device shows an option to be selected by the user;
   wherein the screen information includes screen type information indicating a type of a currently displayed screen and selection target information indicating an option selected by the user on the screen, as the piece of information;
   wherein the instructions further configure the processor to identify, based on the screen type information, the operation target equipment and, based on the selection target information, a candidate control content from the list of the control contents that the user intends to execute and to place the candidate control content at a top of the search results.

3. The vehicle equipment control device according to claim 1, wherein the instructions further configure the processor to obtain vehicle information indicating whether the vehicle is traveling;
   wherein the plurality of control contents include a control content execution of which is prohibited when the vehicle is traveling; and
   wherein the instructions further configure the processor to exclude, when the vehicle is traveling, the control content execution of which is prohibited when the vehicle is traveling from the search result screen displayed.

4. The vehicle equipment control device according to claim 1, wherein the instructions further configure the processor to obtain vehicle information indicating whether the vehicle is traveling;

wherein the plurality of control contents include a control content execution of which is prohibited when the vehicle is traveling; and wherein the instructions further configure the processor to show differently, when the vehicle is traveling, the control content execution of which is prohibited from control contents execution of which is not prohibited when the vehicle is traveling to allow the user to recognize the control content that is not executable when the vehicle is traveling.

5. The vehicle equipment control device according to claim 3 wherein the vehicle information includes traveling condition information representing traveling condition of the vehicle and external environment information representing environment external to the vehicle; and wherein the instructions further configure the processor to arrange the obtained search results based on the obtained vehicle information.

6. The vehicle equipment control device according to claim 1, wherein the instructions further configure the processor to:
identify, of the search results, a highest-placed search result executed; and
determine, based on at least one of a type of a word included in the search term and operation by the user, whether to display the search result screen.

7. The vehicle equipment control device according to claim 1, wherein the instructions further configure the processor to at least one of obtain the search term by subjecting voice inputted by the user to voice recognition processing and obtain the search term based on an input operation made by the user on an input unit to accept input by handwriting.

8. A control content search method comprising:
obtaining, by a processor, a search term;
searching, by the processor, a function management database for the search term, the function management database storing a plurality of control contents executable by a plurality of pieces of equipment used in a vehicle such that each of the control contents is associated with at least one word representing the corresponding content, and obtaining, as search results, a list of control contents corresponding to the search term from the plurality of control contents;
obtaining, by the processor, screen information representing a state of a screen displayed on a display device at a time when a user's operation to start inputting the search term has been accepted, the screen information representing the state of the screen including a piece of information indicating a temporary selection by a user corresponding to one of the plurality of pieces of equipment;
determining, by the processor, an operation target equipment that the user intends to operation from the plurality of pieces of equipment based on the obtained screen information, the operation target equipment being determined based on the piece of information indicating the temporary selection corresponding to the one of the plurality of pieces of equipment;
arranging, by the processor, based on the determined operation target equipment, the list of control contents from the obtained search results in descending order of a degree of relevance to the determined operation target equipment such that control contents in the list of control contents that are executable by the determined operation target equipment are arranged in the descending order before control contents in the list of control contents that are not executable by the determined operation target equipment; and
outputting, by the processor, the arranged search results to a display device so that the control contents in the list of control contents that are executable by the determined operation target equipment are displayed with priority ahead of the control contents in the list of control contents that are not executable by the determined operation target equipment.

* * * * *